(12) United States Patent
Massanes Basi

(10) Patent No.: US 12,100,075 B2
(45) Date of Patent: Sep. 24, 2024

(54) IMAGE RECONSTRUCTION BY MODELING IMAGE FORMATION AS ONE OR MORE NEURAL NETWORKS

(71) Applicant: Siemens Medical Solutions USA, Inc., Malvern, PA (US)

(72) Inventor: Francesc dassis Massanes Basi, Chicago, IL (US)

(73) Assignee: Siemens Medical Solutions USA, Inc., Malvern, PA (US)

(*) Notice: Subject to any disclaimer, the term of this patent is extended or adjusted under 35 U.S.C. 154(b) by 342 days.

(21) Appl. No.: 17/595,196

(22) PCT Filed: Oct. 9, 2019

(86) PCT No.: PCT/US2019/055293
§ 371 (c)(1),
(2) Date: Nov. 11, 2021

(87) PCT Pub. No.: WO2021/071476
PCT Pub. Date: Apr. 15, 2021

(65) Prior Publication Data
US 2022/0215601 A1    Jul. 7, 2022

(51) Int. Cl.
*G06T 11/00*   (2006.01)
*G06N 3/08*   (2023.01)
*G06T 7/00*   (2017.01)

(52) U.S. Cl.
CPC .............. *G06T 11/006* (2013.01); *G06N 3/08* (2013.01); *G06T 7/0012* (2013.01); *G06T 11/005* (2013.01); *G06T 11/008* (2013.01); G06T 2207/10108 (2013.01); G06T 2207/20081 (2013.01); G06T 2207/20084 (2013.01)

(58) Field of Classification Search
CPC .... G06T 11/005; G06T 11/006; G06T 11/008; G06T 7/0012; G06T 2207/10108; G06T 2207/20081; G06T 2207/20084; G06N 3/08
See application file for complete search history.

(56) References Cited

U.S. PATENT DOCUMENTS

| | | | |
|---|---|---|---|
| 2009/0080790 A1* | 3/2009 | Hasegawa | G06T 5/20 |
| | | | 382/260 |
| 2013/0182928 A1 | 7/2013 | Park et al. | |
| 2014/0119627 A1 | 5/2014 | Skretting et al. | |
| 2017/0372193 A1* | 12/2017 | Mailhe | G06N 3/045 |

(Continued)

FOREIGN PATENT DOCUMENTS

JP    2019032211 A    2/2019

OTHER PUBLICATIONS

International Search Report for corresponding application No. PCT/US2019/055293, dated Jun. 1, 2020.

(Continued)

*Primary Examiner* — Daniel G Mariam

(57) ABSTRACT

Systems and methods for image reconstruction based on modeling image formation as one or more neural networks. In accordance with one aspect, one or more neural networks are configured based on physics of image formation (202). The one or more neural networks are optimized using acquired test image data (204). An output image may then be reconstructed by applying current image data as input to the one or more optimized neural networks (208).

20 Claims, 8 Drawing Sheets

(56) References Cited

U.S. PATENT DOCUMENTS

| | | | |
|---|---|---|---|
| 2018/0018757 A1* | 1/2018 | Suzuki | G06N 3/045 |
| 2018/0300907 A1 | 10/2018 | Ding et al. | |
| 2018/0330233 A1* | 11/2018 | Rui | G06N 3/045 |
| 2019/0104940 A1* | 4/2019 | Zhou | G06T 11/008 |
| 2019/0295294 A1* | 9/2019 | Fournie | G06T 7/0012 |

OTHER PUBLICATIONS

Gong, Kuang, et al. "Iterative PET image reconstruction using convolutional neural network representation." IEEE transactions on medical imaging 38.3 (2018): 675-685.

Lim, Sungjun, and Jong Chul Ye. "Blind deconvolution microscopy using cycle consistent CNN with explicit PSF layer." Machine Learning for Medical Image Reconstruction: Second International Workshop, MLMIR 2019, Held in Conjunction with MICCAI 2019, Shenzhen, China, Oct. 17, 2019, Proceedings 2. Springer International Publishing, 2019.

* cited by examiner

IMAGE RECONSTRUCTION BY MODELING IMAGE FORMATION AS ONE OR MORE NEURAL NETWORKS

TECHNICAL FIELD

The present disclosure generally relates to images processing, and more particularly to image reconstruction based on modeling image formation as one or more neural networks.

BACKGROUND

Single Photon Emission Computed Tomography (SPECT) is a nuclear medical tomographic imaging technique that is widely used. For SPECT imaging, a gamma-emitter-labeled pharmaceutical is first administered to a subject. An external device, the gamma camera, is then used to detect the radioactivity stemming from the body, from one or several angles of views. The planar image obtained at one angle of view is the projection of the three-dimensional (3D) distribution onto the two-dimensional (2D) detector plane. 3D images of radioactive source distributions in the subject may be reconstructed by using a sequence of planar images acquired over a range of angles around the subject.

There are various techniques for performing SPECT image reconstruction. One technique involves iterative reconstruction, which typically starts with an assumed image, computes projections from the image, compares the original projection data and updates the image based upon the difference between the calculated and the actual projections. In this approach, the system is modeled as a linear operator of probabilities that encompasses all the image formation effects that will be considered in the reconstruction: rotations of the camera or body, attenuation and even flood correction. This technique is computationally intensive, because it requires re-computation of the projection operator for each view at each iteration of the reconstruction, since the list of probabilities is otherwise too large to store.

Another common technique is based on machine learning. Machine-learning based SPECT image reconstruction typically models the problem by defining a neural network structure and then training the structure to optimize the weights of the layers for increasing reconstruction accuracy. The current approach of deep learning for SPECT reconstruction is the same as deep learning for other science fields, in which the design of the network has nothing to do with the physics of the image formation model.

SUMMARY

Described herein are systems and methods for image reconstruction based on modeling image formation as one or more neural networks. In accordance with one aspect, one or more neural networks are configured based on physics of image formation. The one or more neural networks are optimized using acquired test image data. An output image may then be reconstructed by applying current image data as input to the one or more optimized neural networks.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings.

DETAILED DESCRIPTION

Figure 1:
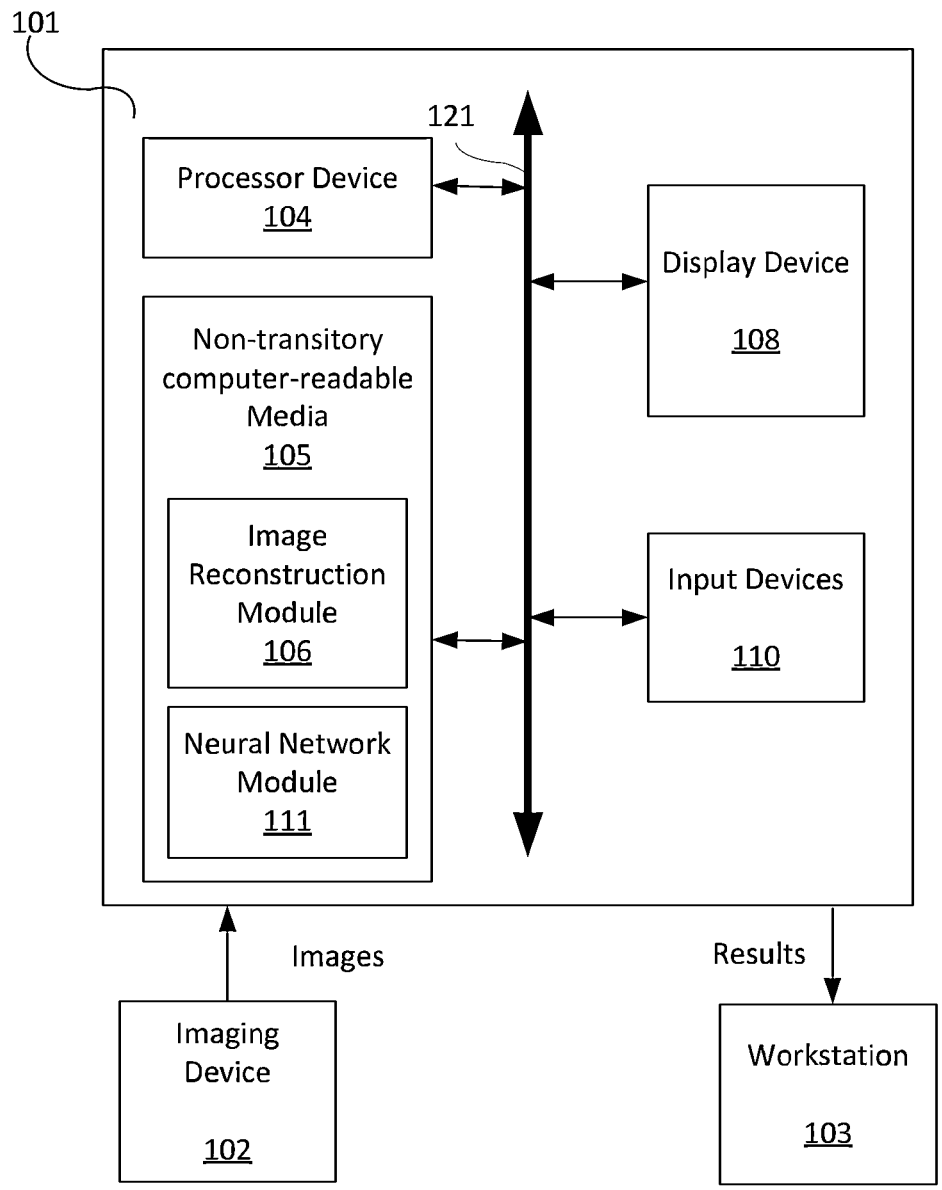
FIG. 1 is a block diagram illustrating an exemplary system.

In the following description, numerous specific details are set forth such as examples of specific components, devices, methods, etc., in order to provide a thorough understanding of implementations of the present framework. It will be apparent, however, to one skilled in the art that these specific details need not be employed to practice implementations of the present framework. In other instances, well-known materials or methods have not been described in detail in order to avoid unnecessarily obscuring implementations of the present framework. While the present framework is susceptible to various modifications and alternative forms, specific embodiments thereof are shown by way of example in the drawings and will herein be described in detail. It should be understood, however, that there is no intent to limit the invention to the particular forms disclosed, but on the contrary, the intention is to cover all modifications, equivalents, and alternatives falling within the spirit and scope of the invention. Furthermore, for ease of understanding, certain method steps are delineated as separate steps; however, these separately delineated steps should not be construed as necessarily order dependent in their performance.

The term "x-ray image" as used herein may mean a visible x-ray image (e.g., displayed on a video screen) or a digital representation of an x-ray image (e.g., a file corresponding to the pixel output of an x-ray detector). The term "in-treatment x-ray image" as used herein may refer to images captured at any point in time during a treatment delivery phase of an interventional or therapeutic procedure, which may include times when the radiation source is either on or off. From time to time, for convenience of description, CT imaging data (e.g., cone-beam CT imaging data) may be used herein as an exemplary imaging modality. It will be appreciated, however, that data from any type of imaging modality including but not limited to x-ray radiographs, MRI (magnetic resonance imaging), PET (positron emission tomography), PET-CT (computed tomography), SPECT (single photon emission computed tomography), SPECT-CT, MR-PET, 3D ultrasound images or the like may also be used in various implementations.

Unless stated otherwise as apparent from the following discussion, it will be appreciated that terms such as "segmenting," "generating," "registering," "determining," "aligning," "positioning," "processing," "computing," "selecting," "estimating," "detecting," "tracking," or the like may refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices. Embodiments of the methods described herein may be implemented using computer software. If written in a programming language conforming to a recognized standard, sequences of instructions designed to implement the methods can be compiled for execution on a variety of hardware platforms and for interface to a variety of operating systems. In addition, implementations of the present framework are not described with reference to any particular programming language. It will be appreciated that a variety of programming languages may be used.

As used herein, the term "image" refers to multi-dimensional data composed of discrete image elements (e.g., pixels for 2D images, voxels for 3D images, doxels for 4D datasets). The image may be, for example, a medical image of a subject collected by CT (computed tomography), MRI (magnetic resonance imaging), ultrasound, or any other medical imaging system known to one of ordinary skill in the art. The image may also be provided from non-medical contexts, such as, for example, remote sensing systems, electron microscopy, etc. Although an image can be thought of as a function from $R^3$ to R, or a mapping to $R^3$, the present methods are not limited to such images, and can be applied to images of any dimension, e.g., a 2D picture, 3D volume or 4D dataset. For a 2- or 3-Dimensional image, the domain of the image is typically a 2- or 3-Dimensional rectangular array, wherein each pixel or voxel can be addressed with reference to a set of 2 or 3 mutually orthogonal axes. The terms "digital" and "digitized" as used herein will refer to images or volumes, as appropriate, in a digital or digitized format acquired via a digital acquisition system or via conversion from an analog image.

The terms "pixels" for picture elements, conventionally used with respect to 2D imaging and image display, "voxels" for volume image elements, often used with respect to 3D imaging, and "doxels" for 4D datasets can be used interchangeably. It should be noted that the 3D volume image is itself synthesized from images obtained as pixels on a 2D sensor array and displays as a 2D image from some angle of view. Thus, 2D image processing and image analysis techniques can be applied to the 3D volume images. In the description that follows, techniques described as operating upon doxels may alternately be described as operating upon the 3D voxel data that is stored and represented in the form of 2D pixel data for display. In the same way, techniques that operate upon voxel data can also be described as operating upon pixels. In the following description, the variable x is used to indicate a subject image element at a particular spatial location or, alternately considered, a subject pixel. The terms "subject pixel", "subject voxel" and "subject doxel" are used to indicate a particular image element as it is operated upon using techniques described herein.

One aspect of the present framework defines one or more neural networks using the physics of image formation. To understand the differences between the present framework and prior methods, consider a simple linear equation:

$$y = a \cdot x + b \quad (1)$$

wherein y denotes the predicted output value, x denotes the input value, a is the coefficient and b is an intercept. The goal is generally to produce the most accurate prediction of y possible. In classical machine learning, $\{(x_i, y_i)\}_{i=1,\ldots,N}$ are used to estimate a and b. In algebraic reconstruction, $\bar{y}$ is acquired and physics is used to explain a and b. One aspect of the present framework uses physics to model the neural network while using a deep learning approach to compute the solution.

In some implementations, the present framework models image formation as one or more neural networks to achieve a faster gradient descent reconstruction of image data. By modeling image formation as a cascade of operations instead of a linear operator, such as in classical iterative reconstruction, the overall size of the computation task is reduced. Time and memory space requirements are greatly reduced, since the neural network need only be computed once and stored in memory (e.g., 500 MB-4 GB memory space). The neural-network formulation may be straightaway applied to any image reconstruction and can natively run on, for example, graphical processing units (GPUs) with no special efforts.

Additionally, the present framework enables development of interesting branches of research, such as intra-iteration attenuation optimization, Generative Adversarial Networks (GAN) research or optimization of image formation estimates. The neural network formulation may be used in deep learning frameworks (e.g., GAN) to automatically compute derivatives of each image formation step. These and other exemplary features and advantages will be described in more details herein. It is understood that while a particular application directed to reconstruction of SPECT images may be shown herein, the technology is not limited to the specific implementations illustrated. The framework may also be applicable to images acquired by other types of modalities.

FIG. 1 is a block diagram illustrating an exemplary system 100. The system 100 includes a computer system 101 for implementing the framework as described herein. Computer system 101 may be a desktop personal computer, a portable laptop computer, another portable device, a minicomputer, a mainframe computer, a server, a cloud infrastructure, a storage system, a dedicated digital appliance, a communication device, or another device having a storage sub-system configured to store a collection of digital data items. In some implementations, computer system 101 operates as a standalone device. In other implementations, computer system 101 may be connected (e.g., using a network) to other machines, such as imaging device 102 and workstation 103. In a network deployment, computer system 101 may operate in the capacity of a server, a client user machine in server-client user network environment, or as a peer machine in a peer-to-peer (or distributed) network environment.

Computer system 101 may include a processor device or central processing unit (CPU) 104 coupled to one or more non-transitory computer-readable media 105 (e.g., computer storage or memory), a display device 108 (e.g., monitor) and various input devices 110 (e.g., mouse or keyboard) via an input-output interface 121. Computer system 101 may further include support circuits such as a cache, a power supply, clock circuits and a communications bus. Various other peripheral devices, such as additional data storage devices and printing devices, may also be connected to the computer system 101.

The present technology may be implemented in various forms of hardware, software, firmware, special purpose processors, or a combination thereof, either as part of the microinstruction code or as part of an application program or software product, or a combination thereof, which is executed via the operating system. In one implementation, the techniques described herein are implemented as computer-readable program code tangibly embodied in one or more non-transitory computer-readable media 105. In particular, the present techniques may be implemented by an image reconstruction module 106 and a neural network module 111. Non-transitory computer-readable media 105 may include random access memory (RAM), read-only memory (ROM), magnetic floppy disk, flash memory, and other types of memories, or a combination thereof. The computer-readable program code is executed by processor device 104 to process images acquired by, for example, an imaging device 102. As such, the computer system 101 is a general-purpose computer system that becomes a specific purpose computer system when executing the computer-readable program code. The computer-readable program code is not intended to be limited to any particular programming language and implementation thereof. It will be appreciated that a variety of programming languages and coding thereof may be used to implement the teachings of the disclosure contained herein.

The same or different computer-readable media 105 may be used for storing image sets, patient records, knowledge base, and so forth. Such data may also be stored in external storage or other memories. The external storage may be implemented using a database management system (DBMS) managed by the processor device 104 and residing on a memory, such as a hard disk, RAM, or removable media. The external storage may be implemented on one or more additional computer systems. For example, the external storage may include a data warehouse system residing on a separate computer system, a picture archiving and communication system (PACS), or any other now known or later developed hospital, medical institution, medical office, testing facility, pharmacy or other medical patient record storage system.

The imaging device 102 may be a nuclear imaging system, such as a single-photon emission computerized tomography (SPECT) scanner, for acquiring images. The workstation 103 may include a computer and appropriate peripherals, such as a keyboard and a display device, and can be operated in conjunction with the entire system 100. For example, the workstation 103 may communicate with the imaging device 102 so that the images collected by the imaging device 102 can be rendered at the workstation 103 and viewed on a display device.

The workstation 103 may communicate directly with the computer system 101 to display processed images and/or output image processing results. The workstation 103 may include a graphical user interface to receive user input via an input device (e.g., keyboard, mouse, touch screen, voice or video recognition interface, etc.) to manipulate visualization and/or processing of the images. For example, the user may view the processed images, and specify one or more view adjustments or preferences (e.g., zooming, cropping, panning, rotating, changing contrast, changing color, changing view angle, changing view depth, changing rendering or reconstruction technique, etc.), navigate to a particular region of interest by specifying a "goto" location, navigate (e.g., stop, play, step through, etc.) temporal volumes of the image set, and so forth.

It is to be further understood that, because some of the constituent system components and method steps depicted in the accompanying figures can be implemented in software, the actual connections between the systems components (or the process steps) may differ depending upon the manner in which the present framework is programmed. Given the teachings provided herein, one of ordinary skill in the related art will be able to contemplate these and similar implementations or configurations of the present framework.

Figure 2:
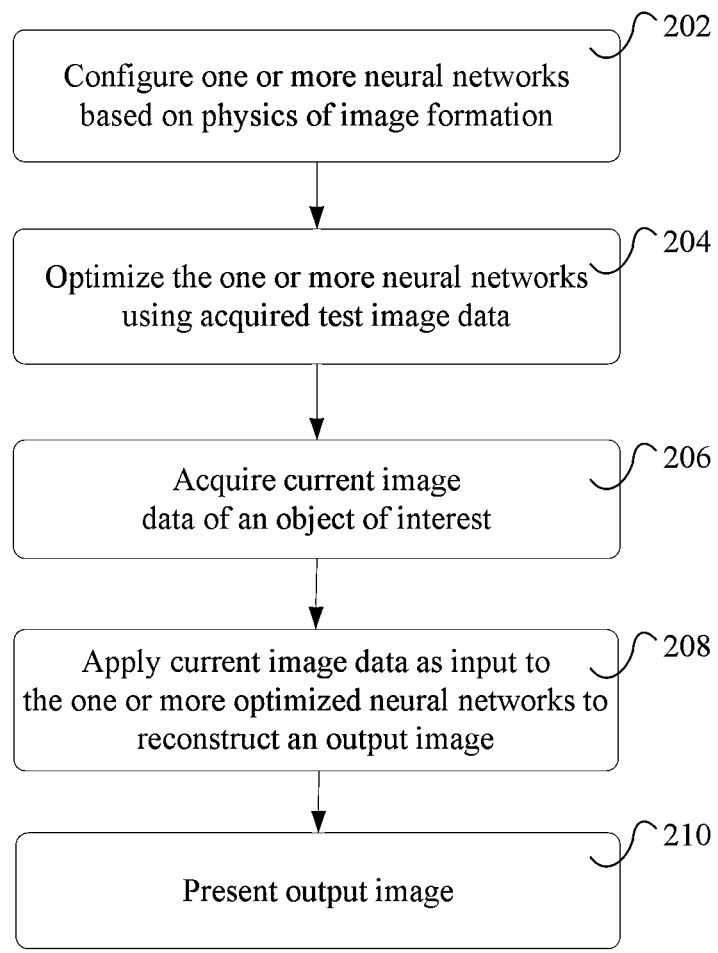
FIG. 2 shows an exemplary image reconstruction method performed by a computer system.

FIG. 2 shows an exemplary image reconstruction method 200 performed by a computer system. It should be understood that the steps of the method 200 may be performed in the order shown or a different order. Additional, different, or fewer steps may also be provided. Further, the method 200 may be implemented with the system 100 of FIG. 1, a different system, or a combination thereof.

At 202, one or more neural networks in neural network module 111 are configured based on the physics of image formation. The physics of image formation depends on the modality of imaging to be used to acquire images of the subject of interest. In some implementations, the one or more neural networks are defined based on SPECT image formation. SPECT is a nuclear medical tomographic imaging technique that represents the distribution of an administered radioactive tracer within an organ. Other types of imaging modalities, such as computed tomography (CT), SPECT/CT and positron emission tomography (PET), may also be used.

Figure 3:
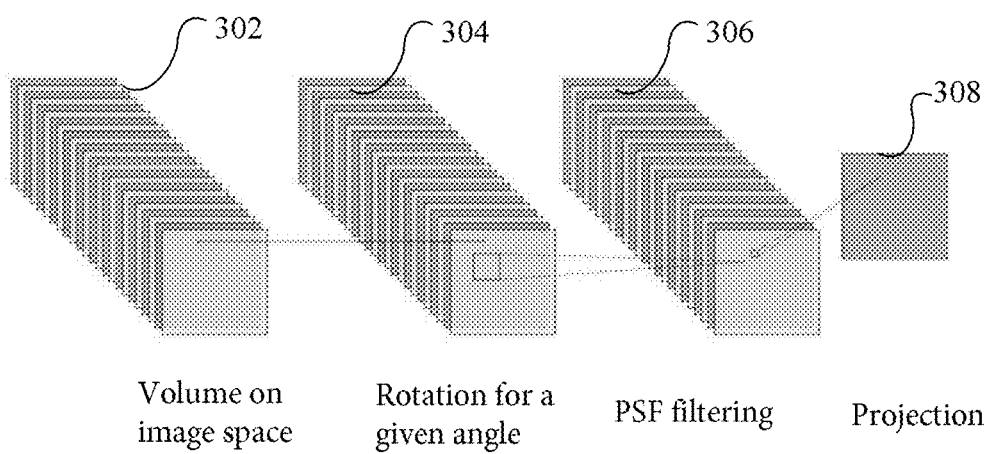
FIG. 3 illustrates an exemplary SPECT image formation.

FIG. 3 illustrates an exemplary SPECT image formation. SPECT systems use one or more gamma cameras typically equipped with collimators mounted on a gantry so that the detector can rotate around the patient. A collection of two-dimensional (2D) projection data 302 is acquired in many evenly spaced angles around the patient. Projection images are generally acquired every n degrees (e.g., n=3-6 degrees) over a full 360-degree or 180-degree arc. The projection dataset 302 is rotated for a given angle to produce rotated dataset 304. The rotated dataset 304 may then be corrected for depth-dependent blurring (e.g., Gaussian blurring) by performing point spread function (PSF) filtering to generate filtered dataset 306. Mathematical algorithms may then be used to estimate 2D projection images 308 from the filtered dataset 306.

Figure 4A:
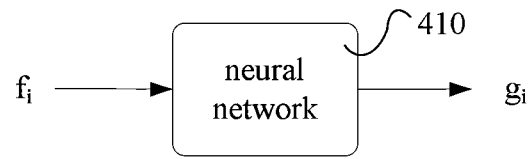
FIG. 4a shows an exemplary neural network.

FIG. 4a shows an exemplary neural network 410. The neural network 410 may function as a black box explained by physics. Input data f is applied to the neural network 410 to generate output data $g_i$, wherein i represents the row index. Each neural network may be modeled based on a different physical effect, including but not limited to, rotation correction, depth dependent PSF filtering error correction, scatter correction, attenuation correction, motion correction, correction of misalignment of heads, etc. Each effect may be modeled by initializing or modifying the weights of the neural network, or adding one or more layers in the neural network.

For example, for attenuation correction, the input coefficients for attenuation correction may be derived from the CT image. However, the attenuation correction coefficients may need to be changed when, for example, the arm moves or a bladder fills during the imaging process. The neural network 410 may update its internal weights to values that are more suitable for the projection image data.

Figure 4B:
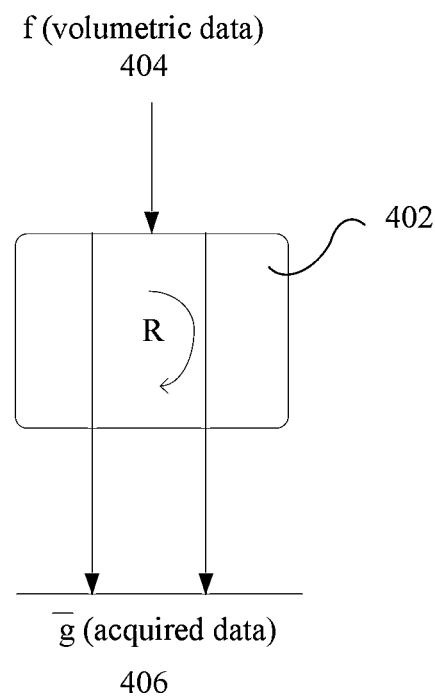
FIG. 4b illustrates an exemplary simple rotation.

FIG. 4b illustrates an exemplary simple rotation 402. The rotation 402 may be represented using the following function:

$$\Sigma_j [\text{psf}_i * R_k f_i](j) - \bar{g}_j^k \qquad (2)$$

wherein f denotes the volumetric data 404, $\bar{g}$ denotes the acquired data 406, psf denotes the point spread function, R denotes the rotation function, i represents the row index, k represents the rotation index and j is the pixel column index. The acquired data $\bar{g}$ represents the depth integral of the images after rotation correction. The initial weights of the neural network may be determined by computing this rotation function (2).

Figures 4C, 4D:
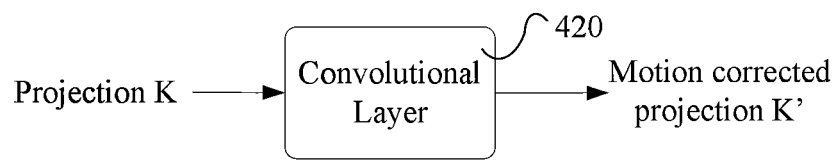
FIG. 4c shows an exemplary convolutional layer that models motion correction.
FIG. 4d illustrates modeling of motion correction.

FIG. 4c shows an exemplary convolutional layer 420 that models motion correction. The layer 420 may be provided as, for example, one of the end layers of the neural network 410. The convolutional layer 420 generates a motion corrected projection data K' from input projection data K.

FIG. 4d illustrates modeling of motion correction. Convolution kernels 424a-b are applied to an input image 422 to generate output images 426a-b. By placing the "1" in the middle of the convolution kernel 424a, no change is produced in the output image 426a. However, if the "1" is placed in another position as shown in convolution matrix 424b, patient motion correction can be modeled as shown in output image 426b.

Figure 4E:
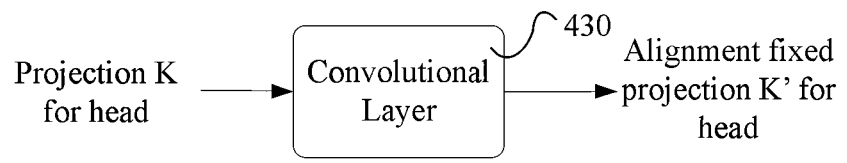
FIG. 4e shows an exemplary convolutional layer that models head misalignment correction.

FIG. 4e shows an exemplary convolutional layer 430 that models head misalignment correction. The layer 430 may be provided as, for example, one of the end layers of neural network 410. Convolutional layer 430 generates alignment-fixed (or corrected) projection data K' for the head based on input projection data K.

Figure 4F:
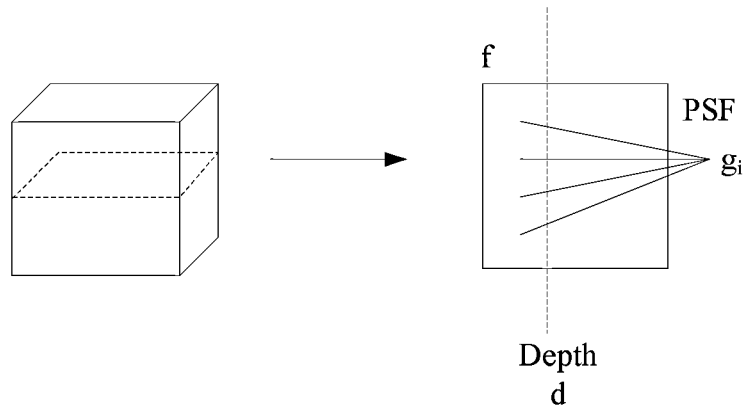
FIG. 4f illustrates an exemplary modeling of point spread function (PSF) filtering correction.

FIG. 4f illustrates an exemplary modeling of point spread function (PSF) filtering correction. The PSF filtering correction may be depth dependent. A PSF describes the response of an imaging system to a point source. At depth d, the value of $g_i$ may be computed by the following convolution equation:

$$g_i = f_{depth\ d} * PSF_d \quad (3)$$

wherein $g_i$ denotes the estimated projected image, $f_{depth\ d}$ denotes the estimated volumetric distribution and $PSF_d$ denotes the point spread function at depth d.

The PSF may be estimated to provide a measure of the amount of blurring that is added to any given object as a result of imperfections in the optics of the imaging system. Filtering using the PSF can be performed to remove blurring in the image. However, the estimation of the PSF may be wrong for various reasons. For example, the collimator may have a defect or the collimator may actually be further than expected. Errors in PSF estimation and filtering may be corrected by updating the weights of at least one convolutional layer of the neural network to optimize the output of PSF filtering.

Figure 5:
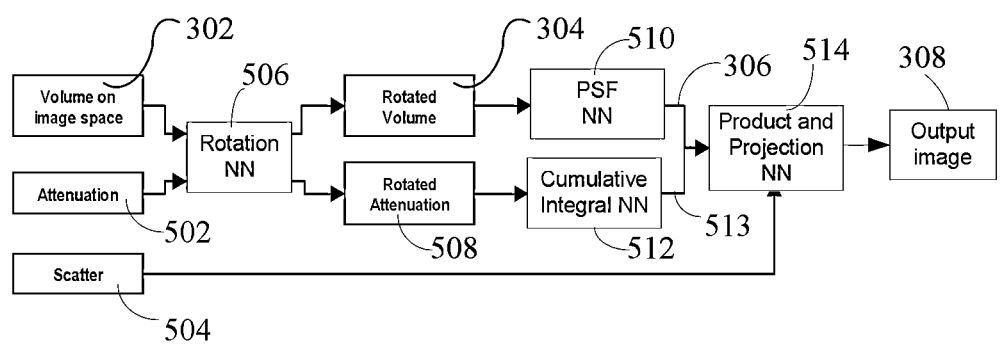
FIG. 5 shows an exemplary neural network architecture for SPECT image reconstruction.

FIG. 5 shows an exemplary neural network architecture 500 for SPECT image reconstruction. The architecture 500 includes a rotation correction neural network 506, a PSF filtering error correction neural network 510, a cumulative integral neural network 512 and a product and projection neural network 514. The exemplary neural network architecture 500 takes into account attenuation correction and scatter correction effects by modeling neural networks 506, 512 and 514 based on such effects. Attenuation of the gamma rays within the subject can lead to significant underestimation of activity in deep tissues. Optimal correction is obtained with measured attenuation data. Attenuation data 502 may be measured in the form of an X-ray CT image, which serves as an attenuation map of the tissue. Scattering of the gamma rays as well as the random nature of gamma rays can also lead to the degradation of quality of SPECT images and cause loss of resolution. Scatter data 504 may be measured to perform scatter correction and resolution recovery to improve resolution of SPECT images.

More particularly, acquired SPECT volume images 302 and measured attenuation data 502 may be applied as input to the rotation neural network 506 to generate a rotated image volume 304 and rotated attenuation data 508. The rotated image volume is applied to the PSF neural network 510 to generate a filtered image volume 306, while the rotated attenuation data is applied to a cumulative integral neural network 512 to generate processed attenuation data 513. The cumulative integral neural network 512 projects the 3D input data to generate 2D attenuation data 513 for data comparison. The filtered image volume 306, the processed attenuation data 513 and measured scatter data 504 are then applied to the product and projection neural network 514 to generate the output estimated projection image 308. The neural network 514 may include, for example, one or more layers that model motion correction or correction of misalignment of heads (as previously discussed with reference to FIGS. 4c-e).

Returning to FIG. 2, at 204, the image reconstruction module 106 optimizes the one or more neural networks in the neural network module 111 using acquired test image data. Each layer of the neural network has a simple gradient. Computing the gradient is independent of the weights of the layer regardless of whether this layer is used alone, or in conjunction with another. Therefore, by defining the layer to be type A, its gradient can be implicitly defined. Thus, the gradients are implicitly defined for each operation and gradient descent can be used to perform the reconstruction without any additional steps. The gradient of each operation may be computed to optimize every step of the image formation model to find a better estimation with predicted attenuation that helps the iterative reconstruction to converge.

Intra-iteration optimization of the projection operator may also be performed. After a number of iterative steps have been taken, if convergence has not yet been achieved it may be caused by a mismatch between the modeling of the image formation and the real-world setup. In some implementations, the input of the neural network is changed in order to maximize the agreement of the output to the acquired data. An update of the attenuation map, head alignment or motion correction may be provided to achieve convergence.

Figure 6:
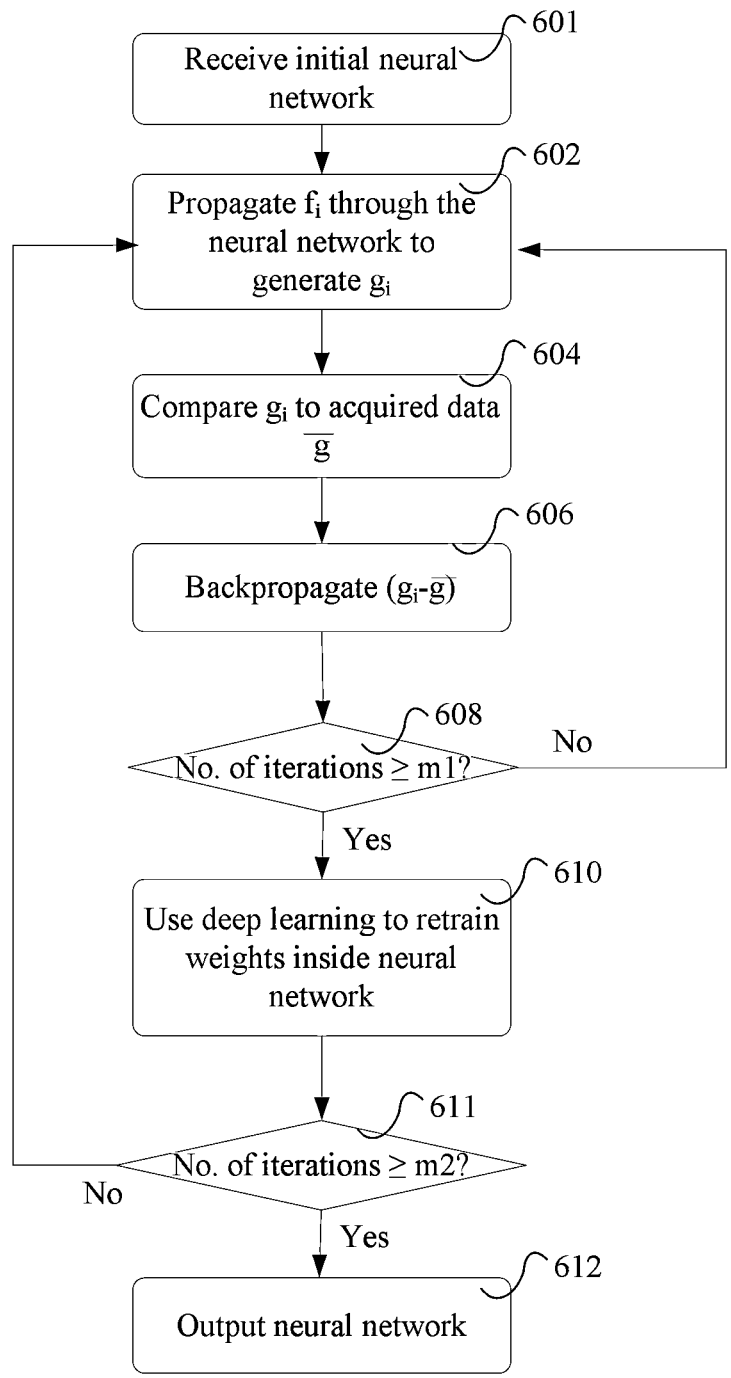
FIG. 6 shows an exemplary method of neural network optimization.

FIG. 6 shows an exemplary method of neural network optimization 204. It should be understood that the steps of the method 204 may be performed in the order shown or a different order. Additional, different, or fewer steps may also be provided. Further, the method 204 may be implemented with the system 100 of FIG. 1, a different system, or a combination thereof.

At 601, image reconstruction module 106 receives the one or more neural networks in the neural network module 111 to be optimized.

At 602, image reconstruction module 106 propagates input data $f_i$ through the neural network to generate output data $g_i$, wherein i denotes the iteration number.

At 604, image reconstruction module 106 compares the output data $g_i$ to acquired test data $\bar{g}$ by calculating the difference $(g_i - \bar{g})$. The difference represents the error and is used to determine the weights to backpropagate through the neural network.

At 606, image reconstruction module 106 backpropagates the difference $(g_i - \bar{g})$ through the neural network. The backpropagation is performed such that $f_{i+1} = f_i + \Delta f$ minimizes $(g_{i+1} - \bar{g})$ with respect to $(g_i - \bar{g})$.

At 608, image reconstruction module 106 determines if the number of iterations is greater than (or equal to) a predetermined number m1. If the predetermined number of iterations m1 has been reached, the method 204 proceeds to 610. If not, steps 602 through 608 are repeated.

At 610, image reconstruction module 106 uses a deep learning technique to retrain weights inside the neural network. Using $f_i$ and $\bar{g}$, the deep learning technique estimates changes in weights of the neural network to achieve an improvement in step 604 (e.g., convergence). For example, in FIG. 5, the weights of one or more of the neural networks 506, 510, 512 or 514 may be optimized. A single neural network (506, 510, 512, 514) may be selectively optimized while "freezing" the other neural networks. If the changes in the weights improve the difference between $g_i$ and $\bar{g}$ by a predetermined threshold, the method 600 continues to 611.

Returning to FIG. 6, at 611, image reconstruction module 106 determines if the number of iterations is greater than (or equal to) a predetermined number m2. If the predetermined number of iterations m2 has been reached, the method 204 proceeds to 612. If not, steps 602 through 610 are repeated.

At 612, image reconstruction module 106 outputs the optimized neural network.

Returning to FIG. 2, at 206, current image data of an object of interest is acquired using, for example, imaging device 102. The current image data is acquired using the same modality (e.g., SPECT) for which the physics of image formation is based on. The object of interest may be any biological object identified for investigation or examination, such as a portion of a patient's organ, brain, heart, leg, arm, and so forth.

At 208, image reconstruction module 106 applies the current image data as input to the one or more optimized neural networks in neural network module 111 to reconstruct an output image.

At 210, the output image is presented. The output image may be rendered and displayed via a user interface at, for example, workstation 103.

While the present framework has been described in detail with reference to exemplary embodiments, those skilled in the art will appreciate that various modifications and substitutions can be made thereto without departing from the spirit and scope of the invention as set forth in the appended claims. For example, elements and/or features of different exemplary embodiments may be combined with each other and/or substituted for each other within the scope of this disclosure and appended claims.

What is claimed is:

1. One or more non-transitory computer-readable media embodying instructions executable by a machine to perform steps for image reconstruction comprising:
   configuring one or more neural networks based on multiple different physical effects of image formation as a cascade of operations;
   optimizing the one or more configured neural networks using acquired test image data; and
   reconstructing an output image by applying current image data as an input to the one or more optimized neural networks.

2. The one or more non-transitory computer-readable media of claim 1 wherein the configuring the one or more neural networks comprises configuring the one or more neural networks based on rotation correction, point spread function (PSF) filtering error correction, scatter correction, attenuation correction, motion correction, correction of misalignment of heads, or a combination thereof.

3. The one or more non-transitory computer-readable media of claim 1 wherein the optimizing the one or more configured neural networks using the acquired test image data comprises performing gradient descent optimization.

4. The one or more non-transitory computer-readable media of claim 1 wherein the current image data comprises single photon emission computed tomography (SPECT) image data.

5. A system for image reconstruction, comprising:
   a non-transitory memory device for storing computer readable program code; and
   a processor in communication with the non-transitory memory device, the processor being operative with the computer readable program code to perform steps including
      configuring one or more neural networks based on multiple different physical effects of image formation as a cascade of operations,
      optimizing the one or more neural networks using acquired test image data, and
      reconstructing an output image by applying current image data as an input to the one or more optimized neural networks.

6. The system of claim 5 wherein the processor is operative with the computer readable program code to configure the one or more neural networks based on physics of SPECT image formation.

7. The system of claim 5 wherein the processor is operative with the computer readable program code to configure the one or more neural networks based on rotation correction, point spread function (PSF) filtering error correction, scatter correction, attenuation correction, motion correction, correction of misalignment of heads, or a combination thereof.

8. The system of claim 5 wherein the processor is operative with the computer readable program code to configure the one or more neural networks by updating weights of at least one of the one or more neural networks for attenuation correction.

9. The system of claim 5 wherein the processor is operative with the computer readable program code to configure the one or more neural networks by initializing weights of at least one of the one or more neural networks based on a rotation function.

10. The system of claim 5 wherein the processor is operative with the computer readable program code to configure the one or more neural networks by providing at least one first layer to at least one of the one or more neural networks that models motion correction.

11. The system of claim 5 wherein the processor is operative with the computer readable program code to configure the one or more neural networks by providing at least one second layer to at least one of the one or more neural networks that models head misalignment correction.

12. The system of claim 5 wherein the processor is operative with the computer readable program code to configure the one or more neural networks by updating weights of at least one of the one or more neural networks for PSF filtering error correction.

13. The system of claim 5 wherein the processor is operative with the computer readable program code to optimize the one or more neural networks by performing gradient descent optimization.

14. The system of claim 13 wherein the processor is operative with the computer readable program code to perform the gradient descent optimization by iteratively propagating an input data through the one or more neural networks to generate an output data, comparing the output data to the acquired test image data and backpropagating a difference between the output data and the acquired test image data through the one or more neural networks.

15. The system of claim 14 wherein the processor is operative with the computer readable program code to retrain weights in the one or more neural networks using a deep learning technique.

16. The system of claim 5 wherein the processor is operative with the computer readable program code to optimize the one or more neural networks by performing intra-iteration optimization.

17. A computer-implemented method of image reconstruction, comprising:
- configuring one or more neural networks based on multiple different physical effects of image formation as a cascade of operations;
- optimizing the one or more neural networks using acquired test image data; and
- reconstructing an output image by applying current image data as an input to the one or more optimized neural networks.

18. The method of claim 17 further comprising configuring the one or more neural networks based on rotation correction, point spread function (PSF) filtering error correction, scatter correction, attenuation correction, motion correction, correction of misalignment of heads, or a combination thereof.

19. The method of claim 18 wherein configuring the one or more neural networks comprises initializing weights of at least one of the one or more neural networks based on a rotation function.

20. The method of claim 17 wherein optimizing the one or more neural networks using the acquired test image data comprises performing gradient descent optimization.

* * * * *